United States Patent

Briechle

[11] Patent Number: 6,130,603
[45] Date of Patent: Oct. 10, 2000

[54] LOW-POWERED RF-LINKED PRICE DISPLAY SYSTEM

[75] Inventor: George T Briechle, New Canaan, Conn.

[73] Assignee: ERS International, Inc., Norwalk, Conn.

[21] Appl. No.: 08/258,409

[22] Filed: Jun. 13, 1994

[51] Int. Cl.⁷ .................................................. H04Q 1/00
[52] U.S. Cl. ........................................ 340/10.34; 455/343
[58] Field of Search .................. 340/825.34, 825.44, 340/10.34; 455/38.3, 343

[56] References Cited

U.S. PATENT DOCUMENTS

| | | | |
|---|---|---|---|
| 4,002,886 | 1/1977 | Sundelin | 235/61.7 R |
| 4,384,361 | 5/1983 | Masaki | 455/343 |
| 4,500,880 | 2/1985 | Gomersall et al. | 340/825.35 |
| 4,724,427 | 2/1988 | Carroll | 340/825.54 |
| 4,821,291 | 4/1989 | Stevens et al. | 375/37 |
| 4,827,395 | 5/1989 | Anders | 340/825.54 |
| 4,888,709 | 12/1989 | Revesz et al. | 364/518 |
| 5,019,811 | 5/1991 | Olsson et al. | 340/825.17 |
| 5,058,203 | 10/1991 | Inagami | 455/343 |
| 5,128,938 | 7/1992 | Borras | 455/343 |
| 5,150,361 | 9/1992 | Wieczorek | 455/343 |
| 5,231,273 | 7/1993 | Caswell | 340/825.44 |
| 5,283,568 | 2/1994 | Asai | 455/343 |
| 5,343,319 | 8/1994 | Moore | 455/343 |

Primary Examiner—Brian Zimmerman
Attorney, Agent, or Firm—Oppedahl & Larson LLP

[57] ABSTRACT

An electronic price display system uses an RF communications channel between a central computer and a multiplicity of electronic price display labels. Each label is powered by a voltaic cell ("battery") such as a lithium cell. The receiver-on time, which in other RF-linked systems contributes heavily to the overall battery drain, here does not contribute appreciably to battery drain because a passive RF transceiver is used to receive and address-decode the address portion of received packets. Upon an address match, the passive RF transceiver generates an interrupt to the controller of the display label, and the interrupt prompts the controller to go to a higher-power-drain state to process the received data. If the received command requires a response, the controller of the label generates a response which is transmitted via RF from the label back to the central computer.

45 Claims, 6 Drawing Sheets

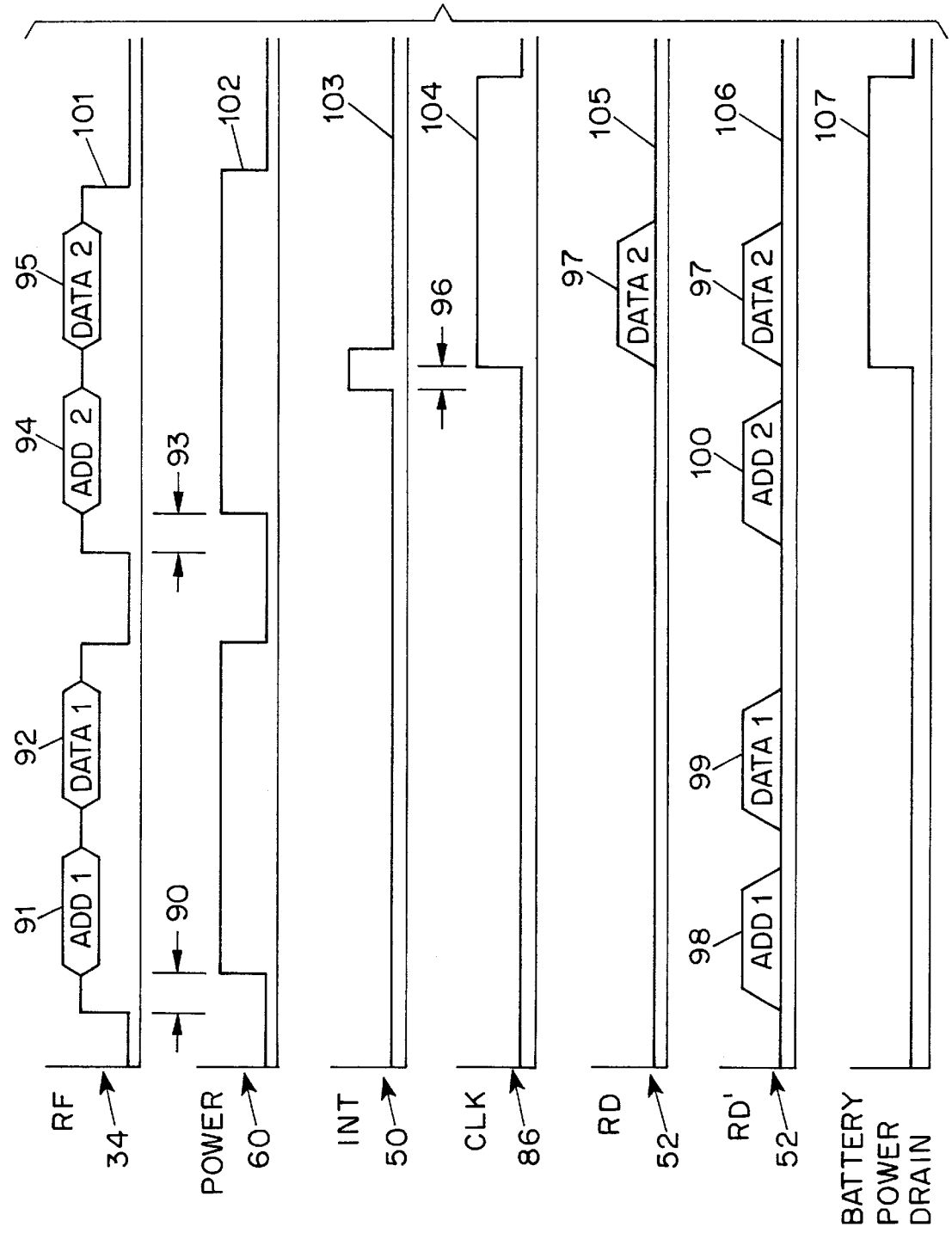

LOW-POWERED RF-LINKED PRICE DISPLAY SYSTEM

BACKGROUND OF THE INVENTION

The invention relates generally to electronic displays that are addressable by a central computer or host, and relates more specifically to such systems as employ RF communications where battery life is of great concern.

Numerous experimenters have attempted to implement systems for the electronic display of prices in stores. The general concept is old and yet has not until recently been commercially viable due to numerous recent advances in the system design. That the general concept is quite old may be seen, for example, in U.S. Pat. No. 4,002,886 to Sundelin, U.S. Pat. No. 4,500,880 to Gomersall and U.S. Pat. No. 5,198,644 to Pfieffer, all of which show electronic price displays which are in communication with a central computer and which change their displayed information based on messages sent by the central computer. None of those prior art systems has, however, been commercially successful.

In one commercially viable electronic shelf label (ESL) system there are typically 15,000 or more individually addressable labels. These ESLs are situated in areas according to the organization of the store.

Specifically, the ESLs are along a shelf edge, and in some systems are mounted on a rail. Normally several shelves are associated vertically in a vertical bay. Several vertical bays may be logically associated as a section or category, and several sections may be positioned in a half-aisle. Appl. Ser. No. 07/757,260 to Failing et. al. (now U.S. Pat. No. 5,241,467), U.S. Pat. No. 5,172,314 to Poland et al., and U.S. Pat. No. 5,245,534 to Waterhouse et. al., all assigned to the same assignee as the present invention and incorporated herein by reference, describe means and methods to collect, maintain, and use location information on each ESL and the product it represents. This information is then used to cause all ESLs in an area or sub-area to change their displays in response to a user request initiated by a hand held unit, a special purpose module, an initiator, or a display function switch. (The user request may be initiated by any of several means including those set forth in copending U.S. Appl. Ser. No. 07/757,675 for System for Recognizing Display Devices, issued Oct. 21, 1995 as U.S. Pat. No. 5,461,561, and incorporated herein by reference.) In the current art, multiple messages must be prepared and sent, one each to each ESL in the desired area, to effect the desired display change. In a dense area, such as Health And Beauty Aids (HABA), the time necessary to address all the ESLs in a section or several adjacent vertical bays may take several tens of seconds, which is too long to allow for efficient in-aisle inter-activity with ESL-displayed store maintenance information, such as Computer-Aided Ordering (CAO), shelf or space management, inventory management, or promotional or merchandising information. In addition, for a power-limited system, such as an RF or IR system powered by solar cells or batteries, it is desirable to minimize the number of transmissions from each ESL and, more importantly, to minimize the receiver-on time in order to conserve power and extend battery life.

Global commands may be used to cause an entire set of ESLs to respond at once to the same message. With a system that has the capability to track the geographic location of ESLs (and their related products), whether determined by the system itself such as with appending locator modules or by a separate RF means, or whether simply tracked by manual audit means and maintained in the host computer data base, it is desirable to cause ESLs within a selected geographic region to display different information. Current systems may issue global commands, such as to one gondola controller, and command an entire half-aisle to respond to a command. Alternatively, each individual ESL in an area may be individually addressed, a process that might be acceptable in lightly populated or small areas. However, when the number of ESLs in the selected area is large (on the order of 100 to 200 ESLs), the update time may take 10 to 20 seconds. The estimate of 10 to 20 seconds assumes a typical processor clock rate, but it should be appreciated that the update time is a direct tradeoff with the processor clock rate, which in turn is directly related to the power consumption. In a wired system, as mentioned above, power consumption is not necessarily of grave concern. But in a wireless system (at least one using CMOS processors) it is desirable to reduce power consumption and thus to run the processors as slowly as possible; thus limits the bandwidth of the communications channel since the processor's ability to frame incoming serial data of a given baud rate is limited by its clock speed.

Numerous desirable system capabilities are possible only if the labels are in a receiver-on state most of the time. Such capabilities are described, for example, in copending U.S. Appl. Ser. No. 08/201,470, issued on Sep. 5, 1995 as U.S. Pat. No. 5,448,226, entitled Shelf Talker Management System, incorporated herein by reference.

Copending U.S. Appl. Ser. No. 08/247,334, entitled Subglobal Area Addressing for Electronic Price Displays, attempts to address this issue by providing means by which groups of labels may be quickly activated while minimizing the total number of labels required to have receivers on. This solution provides some benefit in trading off response time of a limited geographic area with battery life, but requires some additional software overhead to implement.

As previously mentioned, the receiver-on time is a major factor in the battery life for the electronic price display labels. If global addressing is to be performed, all labels must be "listening" (i.e. in a receiver-on state) if the global query is to be successful. Yet if all labels are in a receiver-on state for a substantial portion of the time, then power consumption increases drastically and battery life drops drastically.

In an RF-linked electronic price display system, it is thus highly desirable to have a way in which the receiver-on time can be as much time as desired, without the drawback of drastically worsened battery life.

SUMMARY OF THE INVENTION

An electronic price display system uses an RF communications channel between a central computer and a multiplicity of electronic price display labels. Each label is powered by a voltaic cell ("battery") such as a lithium cell. The receiver-on time, which in other RF-linked systems contributes heavily to the overall battery drain, here does not contribute appreciably to battery drain because a passive RF transceiver is used to receive and address-decode the address portion of received packets. Upon an address match, the passive RF transceiver generates an interrupt to the controller of the display label, and the interrupt prompts the controller to go to a higher-power-drain state to process the received data. If the received command requires a response, the controller of the label generates a response which is transmitted via RF from the label back to the central computer.

DESCRIPTION OF THE DRAWING

The invention will be described with respect to a drawing in several figures, of which:

FIG. 10 shows some time relationships between signals in the system according to the invention.

DETAILED DESCRIPTION

Figure 1:
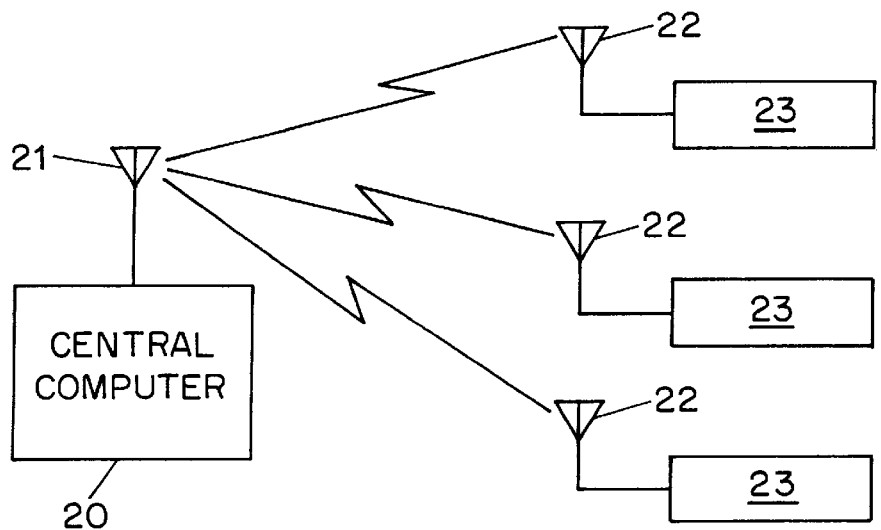
FIG. 1 shows in functional block diagram form an electronic price display using RF communications.

FIG. 1 shows in functional block diagram form an electronic price display using RF communications. The store central computer 20 includes a transceiver which uses antenna 21 to send and receive data packets. A multiplicity of labels 23 are disposed on shelves throughout the store. Each label 23 has an antenna 22 by which data packets are transmitted and received. The shelves and the store are omitted for clarity from FIG. 1.

Figure 2:
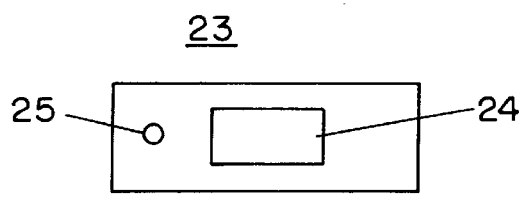
FIG. 2 shows in close-up a front view of a label such as that used in the system of FIG. 1.

FIG. 2 shows in close-up a front view of a label 23 such as that used in the system of FIG. 1. The label 23 has a display 24 which is preferably a liquid crystal display (LCD). Optionally there is a button 25 which may be pressed by a customer or store employee. In addition there may be a bib sensor as described in copending U.S. Appl. Ser. No. 08/201,470, now U.S. Pat. No. 5,448,226, and entitled Shelf Talker Management System, incorporated herein by reference. Furthermore, there may be a position sensor such as is set forth in copending U.S. Appl. Ser. No. 08/031,580 entitled Technique for locating labels in an electronic price display system, and Appl. Ser. No. 08/207,956, entitled Technique for locating electronic labels in an electronic price display system, issued on Dec. 20, 1994 as U.S. Pat. No. 5,374,815, each assigned to the same assignee of the present invention and incorporated herein by reference. The bib sensor and position sensor are omitted for clarity in FIG. 2.

Figure 3:
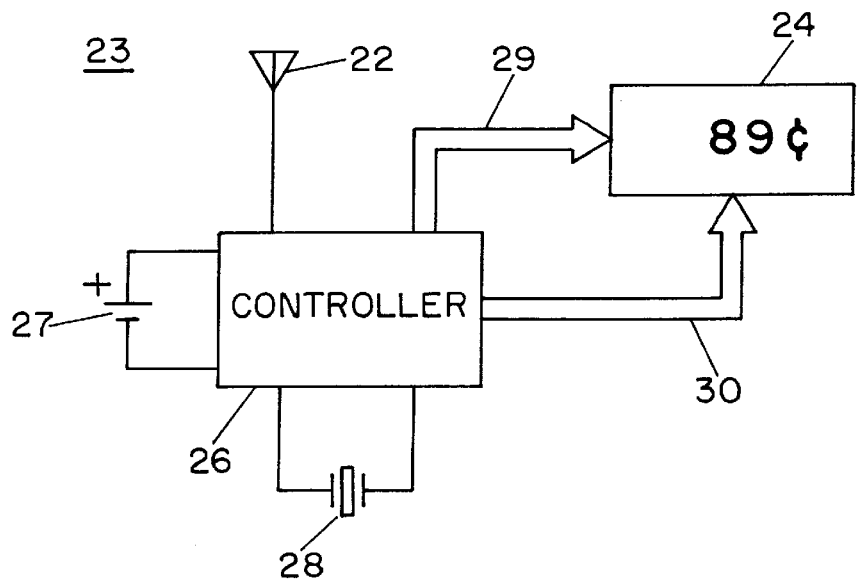
FIG. 3 shows in functional block diagram form a prior art configuration for a label such as that shown in FIG. 2.

FIG. 3 shows in functional block diagram form a prior art configuration for a label such as that shown in FIG. 2. A controller 26 (typically a microcontroller containing a microprocessor) has discrete lines 29 and 30 which address the segments of the LCD 24. A crystal 28 provides a time reference for the controller 26. A battery 27, typically a lithium cell, powers all the components of the label 23. The controller 26 communicates with the rest of the system via antenna 22, and conventional analog circuitry, not shown in FIG. 3, modulates and demodulates the RF signals to and from the antenna 22.

Figure 4:
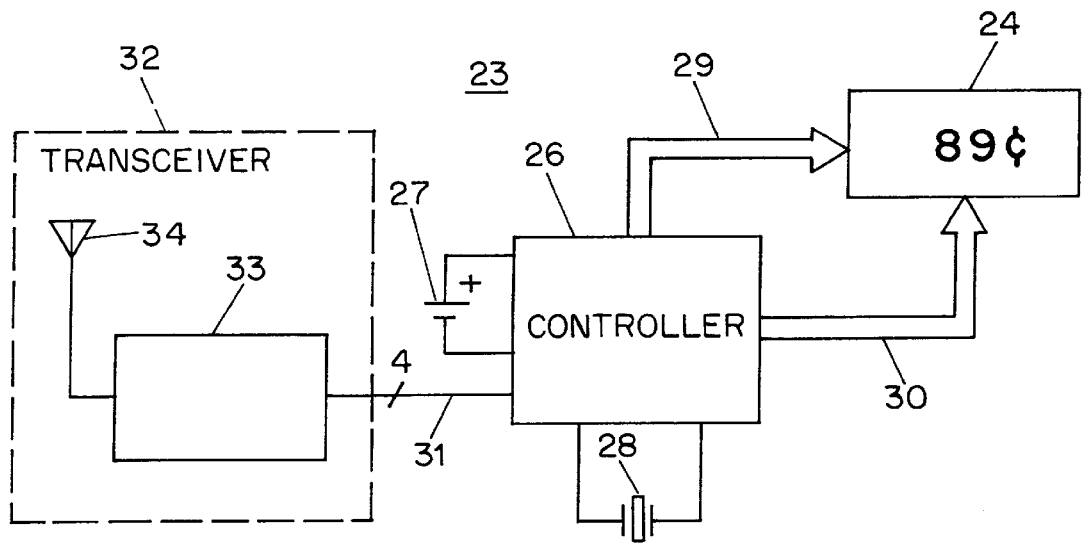
FIG. 4 shows in functional block diagram form a configuration for a label such as that shown in FIG. 2, according to an embodiment of the invention, including a passive RF transceiver 32.

FIG. 4 shows in functional block diagram form a configuration for a label 23 such as that shown in FIG. 2, according to an embodiment of the invention. By comparison with FIG. 3 it will be seen that many parts are in common. The LCD 24, crystal 28, and display control lines 29, 30 are as before. A battery 27 is present, although in this embodiment the battery 27 powers less than all the circuitry of the label 23. To the left is a passive RF transceiver 32, with antenna 34 and a number of signal lines 31 coupling the transceiver 32 and the controller (processor) 26. As will be set forth in greater detail below, the transceiver 32 gets its power from ambient RF energy and so does not shorten the life of the battery 27 even though the transceiver 32 may be understood as always being in a receiver-on state.

Figure 5:
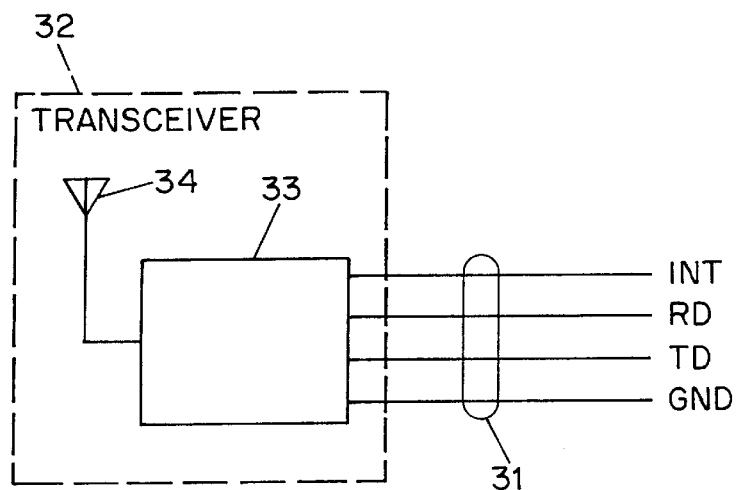
FIG. 5 shows electrical interconnections of the transceiver 32 of FIG. 4.

FIG. 5 shows electrical interconnections 31 of the transceiver 32 of FIG. 4. Outputs from the transceiver 32 are an interrupt line and a received-data line. An input is a transmit-data line. A ground reference is provided.

As will be described below, it is optionally possible to configure the label so that during transmit mode the controller 26 does provide battery power to the transceiver 32. Because transmissions occur only rarely this does not adversely affect battery life. In this optional arrangement at least one additional line 31 carries the battery power.

Figure 6:
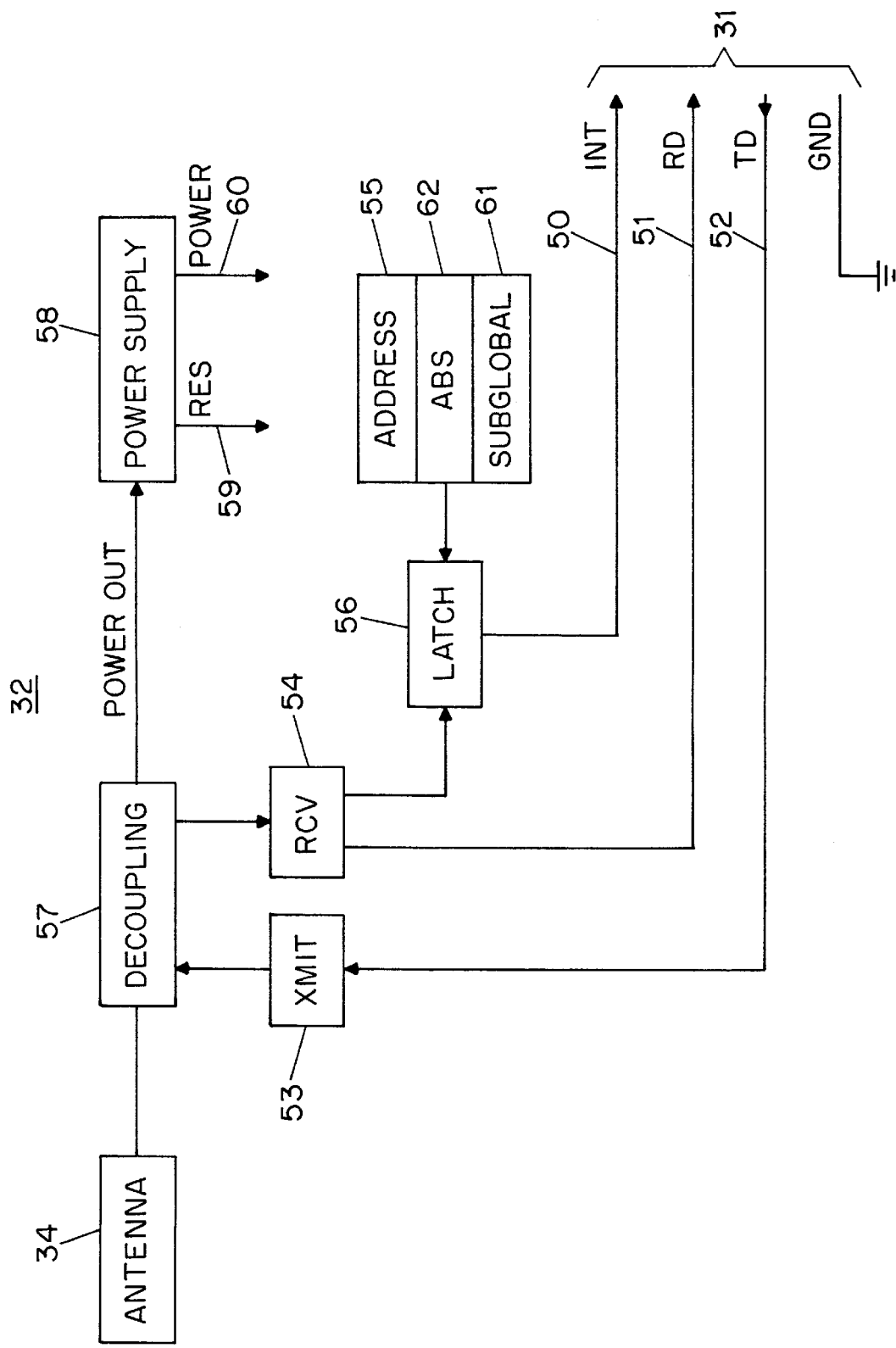
FIG. 6 shows in functional block diagram form the transceiver 32 of FIG. 4.

FIG. 6 shows in functional block diagram form the transceiver 32 of FIG. 4. The interconnection line 31 are seen at lower right. Antenna 34 may from time to time be in a strong enough ambient RF field to activate the transceiver 32. When this happens the decoupling circuitry 57 permits much of the RF power to be coupled to a power supply 58. This power supply 58 not only provides a power level via line 60 to the remainder of the transceiver 32, but also provides a signal 59 which may be thought of as a power-on-reset signal. Such power-on-reset circuitry is well known in the art, resetting selected internal states of the powered device (here, the transceiver 32) upon initial power-up, and releasing the device to function sequentially after a reliable power level has been achieved. A receiver 54 demodulates or detects the signal content of the RF energy. The signal content yields an address portion which is clocked into a latch 56, preferably a shift register. When the address portion has been clocked in a comparison is made with a unique address 62 stored in memory 55 (or, as described below, with a subglobal address 61). Alternatively, as described below, the comparison also includes a global address comparison. In the event of a successful comparison the interrupt line 50 is asserted.

At this point, and throughout the application, it will be appreciated that any particular logic signal referred to here could, in principle, be active low or active high; it is all a matter of convention and the particular logic senses arbitrarily used here should not be considered to limit the invention.

Received data is transmitted serially via line 51. Data to transmit (line 52) is passed to transmit circuitry 53, which modulates an RF carrier and transmits the information via the antenna 34.

Figure 7:
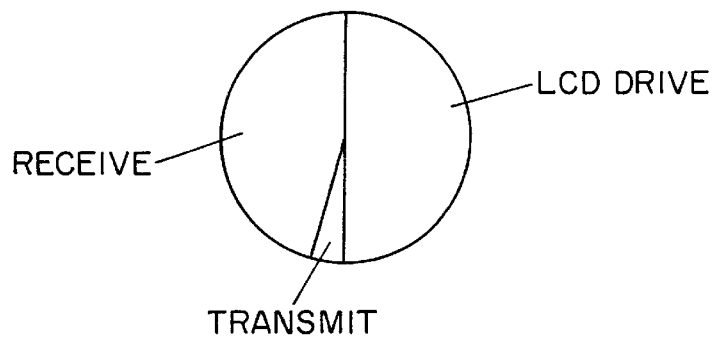
FIG. 7 shows in a pie chart a typical energy budget for a prior-art battery powered RF electronic shelf label.

FIG. 7 shows in a pie chart a typical energy budget for a prior-art battery powered RF electronic shelf label. Experience suggests that about half the battery energy goes to the LCD drive, and most of the remainder goes to powering the receiver. This may seem counter-intuitive to those who attach emphasis to the power consumed during an RF transmission, but it is important to bear in mind that label transmissions happen relatively rarely.

Figure 8A:
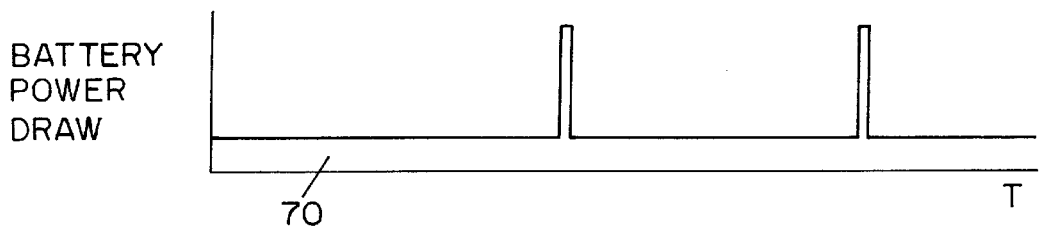
FIGS. 8A, 8B, and 8C compare the energy consumption over time for various electronic shelf label systems.
Figure 8B:
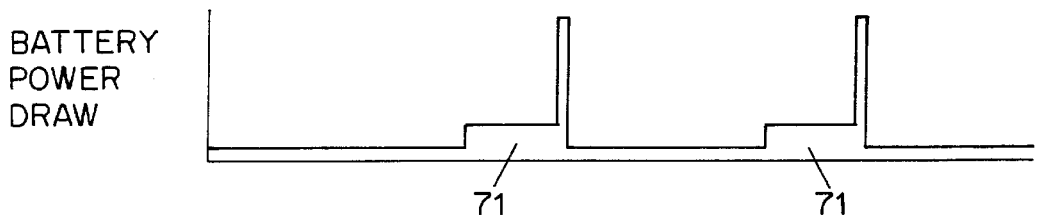
Figure 8C:
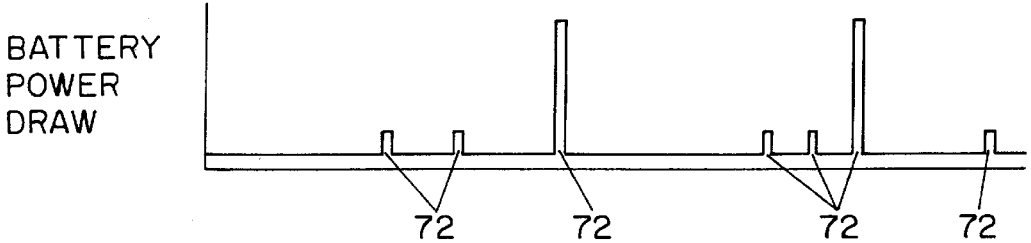

FIGS. 8A, 8B, and 8C compare the energy consumption over time for various electronic shelf label systems. FIG. 8A shows a power regime in a prior art system where the receiver is powered at all times by the battery. The area 70 under the curve represents the power drain.

FIG. 8B shows a power regime in a system where particular labels are told to go "to sleep" for a specified period of time. This cuts power drain to the areas 71, which saves power, but it offers the disadvantage that there are long stretches of time during which the central computer simply cannot get a response from many labels due to their being "asleep". The only choice for the central computer is to (1) keep close track of how long the label had been told to sleep and (2) save up the proposed message until that time has passed. It will be appreciated that this forces the central computer to store lots of information about what sleep instructions have been given to labels, and adds greatly to the complexity of the software of both the store computer and of the labels.

FIG. 8C shows the power regime in the system according to the invention. At most times the battery load is quite modest, limited to that required to power the slowed-down controller and the LCD segments. The receive-time power consumption for a particular label (in the system according to this embodiment of the invention) is increased only during the relatively brief time the particular label is being addressed.

Figure 9:
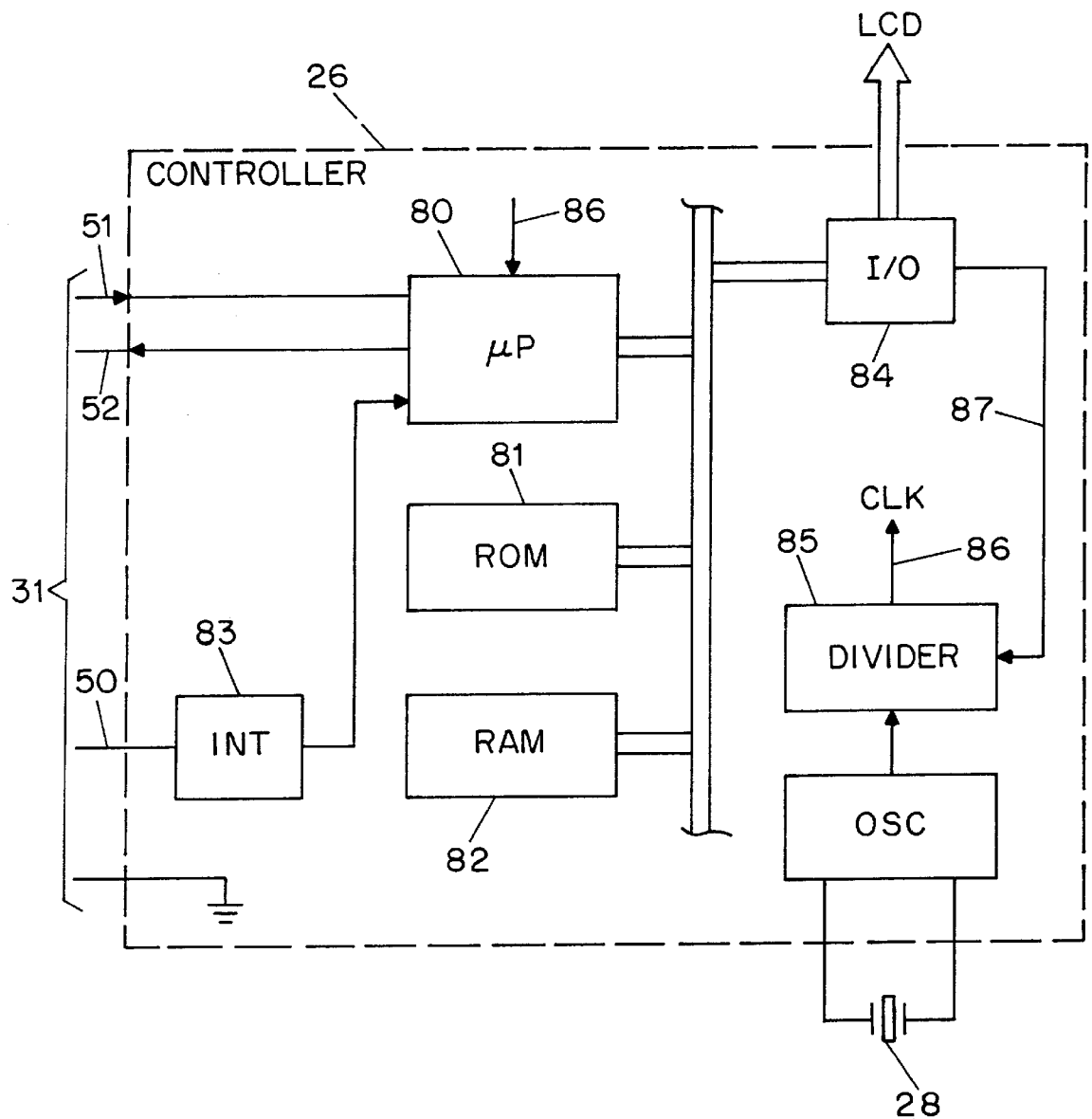
FIG. 9 shows in functional block diagram form a controller chip 26 as used in the system according to the invention.

FIG. 9 shows in functional block diagram form a controller chip 26 as used in the system according to a first embodiment of the invention. A microprocessor 80 is central to the controller 26. It communicates via an internal bus with ROM 81, RAM 82, and with I/O ports 84. The I/O ports permit control of the LCD and other things including (via line 87) the divider 85 used to generate the clock signal 86 within the controller 26.

Those skilled in the art will appreciate that in the context of a CMOS chip such as is preferred, the main way of saving power is slowing down the clock speed. With some controllers other power conservation measures may be possible such as a partial power-down of some of the circuitry. In this context the term "slowing down the clock speed" should be understood as encompassing and referring to all manner of controllable power conservation in a controller 26.

FIG. 10 shows some time relationships between signals in the system according to this embodiment of the invention. The RF ambient (measured at, say antenna 34) is shown in trace or line 101. The RF energy is low, then high, followed by an interval during which a packet is modulated onto the RF carrier. The packet is made up of an address (91, 94) and data (92, 95). In this context the term "data" or "data portion" is desirably actually a command which may include data. The address, command, and data must of course follow some preestablished protocol.

Stated differently, the system of FIG. 1 is preferably defined to have protocols by which the host or central computer 20 and labels 23 exchange information. Central to the enterprise is that the host 20 communicates prices to the labels 23, which prices are displayed in LCD 24 (FIG. 2) so that consumers may see them. Linking the host 20 to the system of cash registers and price scanners at the store checkout counters permits having a high degree of confidence that the price charged at the checkout is the same as the price that appeared when the consumer selected the merchandise. The protocol employed in communication between host 20 and labels 23 may be based upon that set forth in U.S. Appl. Ser. No. 07/995,048, filed Dec. 22, 1992, entitled Technique for communicating with electronic labels in an electronic price display system, which is incorporated herein by reference.

Returning now to FIG. 10, when RF energy reaches some level the power supply 58 of the transceiver 32 develops power, as shown in line 102 which portrays the power line 60. Some nonzero latency time 90 limits how soon modulation can follow the initial emission of RF energy.

Next, the latch 56 (FIG. 6) checks the address portion (e.g. 91 in FIG. 10). If the address 91 does not match, which is what is assumed for illustration in FIG. 10, then the transceiver takes no further action (except optionally to pass along the demodulated received data stream on line RD' 52). In this optional configuration it is assumed that the controller 26 remains in low-power mode (e.g. low clock speed) or "asleep" and so is oblivious to the data RD' associated with the address and data portions 91 and 92.

Next it is assumed that the host transmits a message that contains the unique address of the very label 23 being considered in FIG. 10. When RF energy reaches some level the power supply 58 of the transceiver 32 develops power. The latency period 93 passes.

Next, the latch 56 (FIG. 6) checks the address portion (e.g. 94 in FIG. 10). Here by assumption the address matches. As a result an interrupt is asserted on line 50, shown here with trace 103. The interrupt prompts the controller 26 to "wake up" (e.g. to return to a faster clock speed, or a condition of all circuitry being powered). As shown with trace 104, the clock speed on line 86 increases and stabilizes after a latency period 96. This latency period places a limit on how quickly the data 95 may follow on the heels of the address 94. (Again it will be noted that in this context data 95 means a command and data both.)

The transceiver 32 will then pass the received data on line 52 to the controller 26, as shown by data 97 in trace 105 or 106.

In one embodiment of the transceiver, all received data (98, 99, 100, 97) are passed on line 52 but most are ignored because the controller 26 is "asleep". Only data 97 arrives at a time when the controller 26 is "awake".

In another embodiment of the transceiver, it only bothers to pass along data that immediately follows an address match. This behavior is shown with trace 105. In this embodiment the start bit of the data packet 97 can serve as the interrupt to the controller 26. In this way one signal line can serve the purpose of both lines 50 and 51 in FIG. 6.

Power consumption, shown by trace 107, tracks very closely with clock speed, since the controller is assumed to be CMOS.

The electronic price labels may be snapped into standard shelf-edge C channels, or may be attached to specially shaped rails that have previously been attached to the C channels. In the latter case the shelf rail is preferably that shown in U.S. Appl. Ser. No. 08/036,950, entitled Information Display Rail System, incorporated herein by reference.

Other aspects of system design are set forth in U.S. Appl. Ser. No. 08/114,510 entitled Space Management System and Appl. Ser. No. 08/155,723 now abandoned entitled Electronic Shelf Label Location System, both of which are hereby incorporated by reference.

As mentioned above it is desirable to permit localizing the label 110 to a rail 106 and to permit obtaining information about the precise lateral position of label 110 on the rail 106. If system requirements call for such information it may be obtained by the techniques set forth in the above-referenced U.S. Appl. Ser. No. 08/031,580 entitled Technique for locating labels in an electronic price display system now U.S. Pat. No. 5,374,815, and Appl. Ser. No. 08/207,956, entitled Technique for locating electronic labels in an electronic price display system. Briefly, a characteristic of the rail 106 is varied along its length. One way to do this is with an optically patterned strip. An optical reader on the back of the label 110 reads the pattern to which the label 110 is juxtaposed given its particular position on the rail. The pattern is communicated from the label 110 to the host 100 and permits the host 100 to know with considerable precision the location of the label 110.

Returning now to FIG. 6, it should be mentioned that recent technology advances in radio frequency (RF) integrated circuits have resulted in numerous applications for passive RF receivers and transceivers. Such devices have been developed in low frequency (125 kHz) and high frequency (900 MHz and 2.4 GHz) areas. But most passive transceivers have limited functionality, typically doing nothing more than responding with a stored item of data when "illuminated" with RF energy. The passive transceivers used herein differ from many if not all prior art passive transceivers in that they perform address decoding and communicate interrupts to external circuitry.

It is helpful to review the prior art techniques for addressing electronic price display labels. This is described in greater detail in the above-referenced copending Appl. Ser. No. 08/247,334.

Unique addressing. As mentioned above, one way to address electronic price display labels is by unique addressing. Each label 23 contains an address, and addresses are set to be unique within a store. In FIG. 6 the unique address is called the electronic shelf label identifier, or ESL ID, and is stored in nonvolatile memory 62. As mentioned above, in a typical protocol the host 20 emits a message that contains a unique address and other information such as a command and data. Typically the communications channel is serial and asynchronous, so that the message begins with what may be termed a "start bit", namely the interval of RF energy preceding the address in FIG. 10. The passive transceivers 32 of all of the ESLs 23 detect the start bit and receive most or all of the message. Each transceiver 32 compares the address in the message with its own ESL ID, and in general there is no match between the two. In the case where there is a match the transceiver interrupts the processor (controller 26), which then decodes the command and executes it, acting upon the data present in the message. Ideally the system is closed-loop; the label 23 emits a response and the response contains its unique address. The host 20 watches for the response and takes corrective action if no response is received.

The unique addresses may be burned into the transceivers 32 upon manufacture or may be loaded into the nonvolatile memory of the transceivers 32 after manufacture.

UPC addressing. One investigator has proposed programming each label with the UPC (uniform product code) of the item of merchandise with which it is associated. This is seen, for example, in the above-mentioned U.S. Pat. No. 4,500,880 to Gomersall. That investigator proposes that the UPC then be used to address the label. One drawback of this technique is that a particular item of merchandise may appear in the store in more than one location, or that the number of facings of a product may be so great as to call for more than one label among the facings. This leads to numerous logistical difficulties. One approach is to add one or more digits of suffix address to the UPC to identify the first, second, etc. instances of the UPC in the store. A complete label address is thus the UPC plus the ambiguity-eliminating suffix. This has the drawback that one must follow detailed protocols when a label bearing a suffix is taken out of service or is placed into service; records must be kept of the suffixes in use for a particular UPC value and the records must be of high reliability. Yet another possible drawback in some systems is that the UPC and suffixes represents an address space that is far larger than that which would be minimally necessary to give each label a unique address. Communications bus bandwidth gets consumed carrying address bits that could be eliminated if a more compact address were used.

Another approach is to use only the UPC as the address and to abandon any attempt at resolving ambiguities. In this case all communications with labels has to be open-loop (i.e. no response by labels) since if there were to be a response all labels with a given UPC would respond, and the responses would collide.

SKU addressing. In many store chains management will set up a system of stock-keeping unit numbers (SKUs) that is distinct from the system of UPC code numbers. This permits a variant of the UPC addressing scheme, in which one stores in each label the stock-keeping unit (SKU) of the item of merchandise with which it is associated. The number of digits in an SKU is smaller than in a UPC; this is one reason many retailers use SKUs. But there is still the difficulty that a particular SKU may appear in more than one label in a store, or that the number of facings may call for more than one label for that SKU. This leads to some of the same problems as with UPCs—either the system is open-loop (no label responses) or ambiguity-eliminating digits have to be added to the address to uniquely specify each label. And the ambiguity-eliminating digits have to be administered in detail.

Global addressing. The other extreme in addressing is a global address. As set forth in the above-mentioned Appl. Ser. No. 07/757,675, now U.S. Pat. No. 5,461,561, the address field could be filled with an address that is defined as a "global address", such as all zeros or all ones. Such an address, when received by a label, prompts a label to inspect the remainder of the message to determine whether or not it is supposed to take action. As an example of global addressing, consider a flag within each label that is nearly always in one state (e.g. "off") but that is occasionally on.

The global message, defined by the manner in which the labels are programmed to behave, could mean "the label should respond, regardless of its absolute address, if its flag is on". In a simple case the flag gets set if a label is removed from the rail and is then reattached to the rail. The host 20 emits global queries frequently and (because most labels remain attached to rails most of the time) generally receives no answer to the global query; no label has sensed removal from a rail and reattachment to it since the last time a global query was made. In this way the host 20 learns if a label 23 has been snapped into place on a rail, because the label 23 responds to the global query. Other uses of the powerful global inquiry concept are set forth in the above-mentioned Appl. Ser. No. 07/757,675, now U.S. Pat. No. 5,461,561.

In this context the global addresses are defined, and circuitry 55 in FIG. 6 checks to see if the address in latch 56 happens to be defined as "global". If the answer is in the affirmative, then the transceiver generates the interrupt to the controller.

When the controller 26 "wakes up" in response to the interrupt, it must determine whether the interrupt was due to an absolute address match based on register 62, or was due to a global query. One way to do this is to use discrete interrupt lines from the transceiver 32 to the controller 26. Another way is to encode this information in the first few bits of the command that is the first part of the data 95 (FIG.

10). The controller 26 inspects those bits and determines the reason for the interrupt.

If the teachings of the above-referenced copending Appl. Ser. No. 08/247,334 are employed, then there is defined within each label 23 one or more additional registers 61 (FIG. 6) used for subglobal addressing. In addition, the repertoire of defined messages between host 20 and label 23 includes not only unique-addressed and globally-addressed messages, but also subglobal addresses. For example, the message received by a label 23 may indicate that it is subglobal with reference to a rail ID as defined in copending Appl. Ser. No. 08/247,334. In this case, the transceiver 32 would inspect the rail ID in the received message to see if it matches the contents of the transceiver's own register 61. Generally there would be no match and no further action would be taken by the label 23. But if there is a match, then the label 23 acts on the message.

The embodiments set forth above have tended toward one extreme, namely minimizing the functionality of the transceiver 32. Toward the other extreme, data to be transmitted to the host 20 could be communicated first by the controller 26 to the transceiver 32, after which the transceiver 32 sends the data to the host via the RF channel. When data is being received by the transceiver the entirety of the data could be received and stored in the transceiver, and then later when the controller 26 has "awakened" the entirety of the data could be communicated to the controller 26, including the address 94 (FIG. 10).

The foregoing discussion assumes that the controller 26 is set up to have higher and lower clock speeds as a way of conserving battery power. But if one reconsiders the experience reflected in FIG. 7 one can appreciate that even if the controller 26 is operated at a fixed clock rate, the teachings of the invention offer their benefits. If battery consumption can be limited basically to the LCD driving and transmitting functions, and if the power requirements for receiving and address decoding are offloaded to the self-powered RF transceiver, then the energy content of a standard lithium cell suffices to give many years of service life for the electronic shelf label.

In such an alternative embodiment, if the RF transceiver generates an interrupt to the controller, then the controller simply receives the serial data from the transceiver, but does not actuate a change in clock rate. The controller 26 is as shown in FIG. 9 except there is no need for a programmable divider 85 controlled by control line 87.

Some advantages of a system according to the invention simplifies the central control system since complex power conserving protocols are no longer necessary. Communications to any label may be initiated immediately without prior processing to awaken labels from sleep modes. Nor is it necessary to manage labels by placing them in sleep modes according to some schedule of anticipated activities. The result is greatly simplified software, fewer machine cycles in the store central computer for supporting the system, and less disk storage requirements in the central computer to keep track of the individual label sleep states.

Those skilled in the art will appreciate that strictly speaking the term "battery" refers to more than one electrochemical cell, but that a common usage of the term "battery" includes single electrochemical cells. That common usage is intended here.

It will also be appreciated that while the type of power supply powering the controller is preferred to be a voltaic cell, the teachings of the invention offer their benefits even if other power supplies are used, such as photoelectric (photovoltaic) cells, photoelectric cells with low-leakage capacitors, photoelectric cells with rechargeable batteries, and photoelectric cells with non-rechargeable batteries such as the preferred lithium batteries.

Those skilled in the art will appreciate that while the invention is described with respect to a single antenna for transmission and reception (both at the label and at the central computer), and while such use of a single antenna is thought to be preferred, the invention could equally well be carried out with distinct antennas.

Those skilled in the art will readily appreciate that if the output of the passive RF transceiver is like that shown in line 105 of FIG. 10, the output could serve both as an interrupt and as a data line. With an appropriately configured controller this could reduce the number of communication lines required between the transceiver and the controller by one. Thus, as used herein the term "interrupt" should be understood as encompassing either a distinct electrical signal (e.g. line 50 separate from a received-data signal 51 in FIG. 6) or as the information content (such as a start bit) representing the beginning of a received data portion in the case (line 105 of FIG. 10) where such data implies that an address match has occurred.

Those skilled in the art will appreciate that while the preferred way to perform address decoding is to check for the condition of the received address and predetermined address being identical, one could test for any of a number of other predetermined relationships, such as one address being the logical complement of the other. The term "address match", then, should be understood as embracing a test for identical addresses or addresses having some predetermined relationship.

It will be appreciated that while the embodiment is described, for simplicity, as having a single central computer with a single transmitting antenna, the invention does not depend on this. A system according to the invention could just as well have a plurality of antennas positioned to reach all parts of a store. The processing activities of the central computer could be dispersed to a number of interacting entities which collectively accomplish what is here described, for simplicity, as a single computer.

Those skilled in the art will have no difficulty devising obvious variations and modifications of the embodiments set forth herein, all of which should be considered to be within the scope of the invention as defined by the following claims.

I claim:

1. An electronic price display system comprising a central computer and an RF transceiver communicatively coupled therewith, and further comprising a multiplicity of electronic price display labels each with a unique address, each electronic price display label comprising:

a housing, a display within the housing, a power source within the housing, a controller within the housing and controlling the display and powered by the power source, a passive RF transceiver within the housing and not powered by the power source, an antenna communicatively coupled with the transceiver, the controller further characterized in having a clock speed switchable between a high speed and a low speed, the low speed selected to be sufficient to control the display, the controller comprising an interrupt input causing a switch to the high speed, the transceiver further characterized in having a register defined to contain the unique address of the label, and in having means responsive to received RF energy at the antenna for receiving an address modulated in the RF energy, for testing for a match between the unique address of the label and the received address, and for generating an interrupt output in the event of the match; the interrupt output of the transceiver operatively coupled with the interrupt input of the controller.

2. The system of claim 1 wherein the display is a liquid crystal display.

3. The system of claim 1 wherein the transceiver further comprises a received-data output indicative of data received in the RF energy, and wherein the controller further comprises a received-data input communicatively coupled with the received-data output.

4. The system of claim 1 wherein the controller further comprises a transmit-data output, and wherein the transceiver further comprises a transmit-data input communicatively coupled with the transmit-data output, the transceiver having transmit means transmitting data from the transmit-data input at the antenna.

5. The system of claim 1 wherein the power source is a voltaic cell.

6. The system of claim 1 wherein the power source is a photovoltaic cell.

7. The system of claim 1 wherein the power source is a photovoltaic cell and low-leakage capacitor.

8. The system of claim 1 wherein the power source is a photovoltaic cell and a rechargeable battery.

9. The system of claim 1 wherein the power source is a photovoltaic cell and a non-rechargeable voltaic cell.

10. A method for use with an electronic price display system having a central computer and an RF transceiver communicatively coupled therewith, and further comprising a multiplicity of electronic price display labels each with a unique address, each electronic price display label comprising a housing, a display within the housing, a power source within the housing, a controller within the housing and controlling the display and powered by the power source, a passive RF transceiver within the housing and not powered by the power source, an antenna communicatively coupled with the transceiver, the controller further characterized in having a clock speed switchable between a high speed and a low speed, the low speed selected to be sufficient to control the display, the controller comprising an interrupt input causing a switch to the high speed, the transceiver further characterized in having a register defined to contain the unique address of the label, and in having means responsive to received RF energy at the antenna for receiving an address modulated in the RF energy, for testing for a match between the unique address of the label and the received address, and for generating an interrupt output in the event of the match, the interrupt output of the transceiver operatively coupled with the interrupt input of the controller; the method comprising the steps of:

preparing, within the central computer, a packet comprising address and data portions, the address portion selected to match the unique address of a particular one of the labels;

transmitting RF energy;

modulating the RF energy to communicate the address portion of the packet;

receiving, within the passive RF transceiver, the RF energy and deriving power therefrom;

demodulating, within the passive RF transceiver, the address portion of the packet;

testing, within the passive RF transceiver, for a match between the demodulated address portion of the packet and the unique address of the label;

generating an interrupt in the event of a match;

switching the controller to the high speed in the event of the interrupt;

modulating the RF energy to communicate the data portion of the packet;

demodulating, within the passive RF transceiver, the data portion of the packet and communicating the demodulated data to the controller;

receiving the demodulated data at the controller and acting upon said data; and switching the controller to the low speed after receiving the demodulated data.

11. The method of claim 10 wherein acting upon said data further comprises changing the contents of the display in response thereto.

12. The method of claim 10 further comprising the steps of:

preparing a response in the controller;

transmitting the response via the label antenna;

receiving the response at the antenna of the central computer; and acting upon the response at the central computer.

13. An electronic price display label comprising:

a housing, a display within the housing, a power source within the housing, a controller within the housing and controlling the display and powered by the power source, a passive RF transceiver within the housing and not powered by the power source, an antenna communicatively coupled with the transceiver, the controller further characterized in having a clock speed switchable between a high speed and a low speed, the low speed selected to be sufficient to control the display, the controller comprising an interrupt input causing a switch to the high speed, the transceiver further characterized in having a register defined to contain the unique address of the label, and in having means responsive to received RF energy at the antenna for receiving an address modulated in the RF energy, for testing for a match between the unique address of the label and the received address, and for generating an interrupt output in the event of the match; the interrupt output of the transceiver operatively coupled with the interrupt input of the controller.

14. The label of claim 13 wherein the display is a liquid crystal display.

15. The system of claim 13 wherein the transceiver further comprises a received-data output indicative of data received in the RF energy, and wherein the controller further comprises a received-data input communicatively coupled with the received-data output.

16. The system of claim 13 wherein the controller further comprises a transmit-data output, and wherein the transceiver further comprises a transmit-data input communicatively coupled with the transmit-data output, the transceiver having transmit means transmitting data from the transmit-data input at the antenna.

17. The system of claim 13 wherein the power source is a voltaic cell.

18. The system of claim 13 wherein the power source is a photovoltaic cell.

19. The system of claim 13 wherein the power source is a photovoltaic cell and low-leakage capacitor.

20. The system of claim 13 wherein the power source is a photovoltaic cell and a rechargeable battery.

21. The system of claim 13 wherein the power source is a photovoltaic cell and a non-rechargeable voltaic cell.

22. A passive RF transceiver comprising:

an antenna;

a power supply;

a demodulator;

a decoupler connected to the antenna coupling a portion of any RF energy received at the antenna to the power supply and coupling a portion of the RF energy to the demodulator;

a reset circuit responsive to energy at the power supply for generating a reset signal associated with a predefined level of energy;

the demodulator further characterized in demodulating the RF energy to received data and a clock;

a latch responsive to the data and clock for storing a portion of the received data therein;

a first address store containing a predetermined address;

means comparing the contents of the latch and the first address store and generating an interrupt output from the transceiver in the event of a match thereof; and means communicating received data as an output from the transceiver.

23. The transceiver of claim 22 further comprising:

a transmit-data input to the transceiver; and a transmitter coupled to the antenna and responsive to the transmit-data input for transmitting the data at the antenna.

24. The transceiver of claim 22 further comprising:

a second address store;

the transceiver responsive to a message of a first type for loading data within the message into the second address store;

the transceiver responsive to a message of a second type for comparing data within the message with the contents of the second address store, and generating an interrupt output in the event of a comparison match.

25. An electronic price display system comprising a central computer and an RF transceiver communicatively coupled therewith, and further comprising a multiplicity of electronic price display labels each with a unique address, each electronic price display label comprising:

a housing, a display within the housing, a power source within the housing, a controller within the housing and controlling the display in response to an input and powered by the power source, a passive RF transceiver within the housing and not powered by the power source, an antenna communicatively coupled with the transceiver, the transceiver further characterized in having a register defined to contain the unique address of the label, and in having means responsive to received RF energy at the antenna for receiving an address modulated in the RF energy, for testing for a match between the unique address of the label and the received address, and for generating an output in the event of the match;

the output of the transceiver operatively coupled with the input of the controller.

26. The system of claim 25 wherein the display is a liquid crystal display.

27. The system of claim 25 wherein the transceiver further comprises a received-data output indicative of data received in the RF energy, and wherein the controller further comprises a received-data input communicatively coupled with the received-data output.

28. The system of claim 25 wherein the controller further comprises a transmit-data output, and wherein the transceiver further comprises a transmit-data input communicatively coupled with the transmit-data output, the transceiver having transmit means transmitting data from the transmit-data input at the antenna.

29. The system of claim 25 wherein the power source is a voltaic cell.

30. The system of claim 25 wherein the power source is a photovoltaic cell.

31. The system of claim 25 wherein the power source is a photovoltaic cell and low-leakage capacitor.

32. The system of claim 25 wherein the power source is a photovoltaic cell and a rechargeable battery.

33. The system of claim 25 wherein the power source is a photovoltaic cell and a non-rechargeable voltaic cell.

34. A method for use with an electronic price display system having a central computer and an RF transceiver communicatively coupled therewith, and further comprising a multiplicity of electronic price display labels each with a unique address, each electronic price display label comprising a housing, a display within the housing, a power source within the housing, a controller within the housing and controlling the display in response to an input and powered by the power source, a passive RF transceiver within the housing and not powered by the power source, an antenna communicatively coupled with the transceiver, the transceiver further characterized in having a register defined to contain the unique address of the label, and in having means responsive to received RF energy at the antenna for receiving an address modulated in the RF energy, for testing for a match between the unique address of the label and the received address, and for generating an output in the event of the match, the output of the transceiver operatively coupled with the input of the controller; the method comprising the steps of:

preparing, within the central computer, a packet comprising address and data portions, the address portion selected to match the unique address of a particular one of the labels;

transmitting RF energy;

modulating the RF energy to communicate the address portion of the packet;

receiving, within the passive RF transceiver, the RF energy and deriving power therefrom;

demodulating, within the passive RF transceiver, the address portion of the packet;

testing, within the passive RF transceiver, for a match between the demodulated address portion of the packet and the unique address of the label;

generating an output in the event of a match;

demodulating, within the passive RF transceiver, the data portion of the packet and communicating the demodulated data to the controller; and receiving the demodulated data at the controller and acting upon said data.

35. The method of claim 34 wherein acting upon said data further comprises changing the contents of the display in response thereto.

36. The method of claim 34 further comprising the steps of:

preparing a response in the controller;

transmitting the response via the label antenna;

receiving the response at the antenna of the central computer; and acting up on the response at the central computer.

37. An electronic price display label comprising:

a housing, a display within the housing, a power source within the housing, a controller within the housing and controlling the display in response to an input and powered by the power source, a passive RF transceiver within the housing and not powered by the power source, an antenna communicatively coupled with the transceiver, the transceiver further characterized in having a register defined to contain the unique address of the label, and in having means responsive to received RF energy at the antenna for receiving an address modulated in the RF energy, for testing for a match between the unique address of the label and the received address, and for generating an output in the event of the match; the output of the transceiver operatively coupled with the input of the controller.

38. The label of claim 37 wherein the display is a liquid crystal display.

39. The system of claim 37 wherein the transceiver further comprises a received-data output indicative of data received in the RF energy, and wherein the controller further comprises a received-data input communicatively coupled with the received-data output.

40. The system of claim 37 wherein the controller further comprises a transmit-data output, and wherein the transceiver further comprises a transmit-data input communicatively coupled with the transmit-data output, the transceiver having transmit means transmitting data from the transmit-data input at the antenna.

41. The system of claim 37 wherein the power source is a voltaic cell.

42. The system of claim 37 wherein the power source is a photovoltaic cell.

43. The system of claim 37 wherein the power source is a photovoltaic cell and low-leakage capacitor.

44. The system of claim 37 wherein the power source is a photovoltaic cell and a rechargeable battery.

45. The system of claim 37 wherein the power source is a photovoltaic cell and a non-rechargeable voltaic cell.

* * * * *